(12) United States Patent
Yoshikawa (10) Patent No.: US 7,294,992 B2
(45) Date of Patent: Nov. 13, 2007

(54) SEMICONDUCTOR DEVICE, WITH AN OFF DETECTION CIRCUIT

(75) Inventor: Noriaki Yoshikawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/531,612

(22) Filed: Sep. 13, 2006

(65) Prior Publication Data

US 2007/0085589 A1    Apr. 19, 2007

(30) Foreign Application Priority Data

Sep. 29, 2005    (JP)    ............................ 2005-285625

(51) Int. Cl.
G05F 1/613    (2006.01)
G05F 1/656    (2006.01)

(52) U.S. Cl. ...................... 323/222; 323/223; 323/282; 323/284

(58) Field of Classification Search ................ 323/222, 323/282, 284, 286, 223, 271
See application file for complete search history.

(56) References Cited

U.S. PATENT DOCUMENTS

| | | | |
|---|---|---|---|
| 6,472,856 B2 * | 10/2002 | Groom et al. .............. | 323/284 |
| 6,528,976 B1 * | 3/2003 | Lenk et al. ................. | 323/282 |
| 6,563,294 B2 * | 5/2003 | Duffy et al. ................ | 323/283 |
| 6,580,627 B2 | 6/2003 | Toshio | |
| 6,858,996 B2 | 2/2005 | Green | |
| 6,897,682 B2 | 5/2005 | Nadd | |
| 6,979,918 B2 | 12/2005 | Aoshima et al. | |
| 6,979,981 B2 | 12/2005 | Yoshikawa | |
| 7,132,818 B2 * | 11/2006 | Matsuura .................... | 323/222 |
| 7,180,274 B2 * | 2/2007 | Chen et al. ................. | 323/222 |

* cited by examiner

*Primary Examiner*—Bao Q. Vu
(74) *Attorney, Agent, or Firm*—Oblon, Spivak, McClelland, Maier & Neustadt, P.C.

(57) ABSTRACT

According to the present invention, a semiconductor device is provided wherein a stepdown-type DC-DC converter includes a first off detection circuit, a second off detection circuit, a capacitor, a capacitor, a diode, inverters, an inductor, a first level shift circuit, a second level shift circuit, a third level shift circuit, a 2-input NAND circuit, a 2-input NAND circuit, a high-side N-channel power MOS transistor and a low-side N-channel power MOS transistor. The first off detection circuit and the second off detection circuit reduce fall times of the gates of the N-channel power MOS transistors, thereby reducing dead time.

18 Claims, 9 Drawing Sheets

SEMICONDUCTOR DEVICE, WITH AN OFF DETECTION CIRCUIT

CROSS REFERENCE TO RELATED APPLICATIONS

This application is based upon and claims benefit of priority under 35 USC 119 from the Japanese Patent Application No. 2005-285625, filed on Sep. 29, 2005, the entire contents of which are incorporated herein by reference.

BACKGROUND OF THE INVENTION

DC-DC converters, inverters or regulators and the like are provided with high-side switching elements and low-side switching elements at output sections thereof. In addition, mask time setting circuits for setting a dead time during which the pair of switching elements are simultaneously switched off are provided in order to prevent both switching elements from being simultaneously switched on, whereby breakthrough currents are generated.

In the DC-DC converter described in US Patent Application Publication 2004/0207372 or the like, in consideration of variations in elements, it is necessary to set a long delay time of the mask time setting circuit to make sure that the high-side and low-side switching elements are not simultaneously switched on. Therefore, a problem may exist where the dead time is lengthened, thereby preventing improvement of conversion efficiency of the DC-DC converter.

SUMMARY OF THE INVENTION

A semiconductor device according to an aspect of the present invention includes: a high-side switching element provided on a high-potential side power source side and switched on/off by a signal inputted to a control electrode; a low-side switching element provided on a low-potential side power source side and switched on/off by a signal inputted to a control electrode; a first off detection circuit having a first constant current source which generates a constant current, a first transistor in which a first electrode is connected to the control electrode of the low-side switching element and a second electrode is connected to the first constant current source where the first transistor is switched on by a first voltage applied to the control electrode, and a first signal level detection section which detects a signal level of the control electrode of the low-side switching element, where the first constant current source and the first transistor discharge charges accumulated in the first signal level detection section when the low-side switching element switches from the on state to the off state.

A semiconductor device according to another aspect of the present invention includes: a high-side switching element provided on a high-potential side power source side and switched on/off by a signal inputted to a control electrode; a low-side switching element provided on a low-potential side power source side and switched on/off by a signal inputted to a control electrode; a second off detection circuit having a second constant current source which generates a constant current, a second transistor in which a first electrode is connected to the control electrode of the high-side switching element and a second electrode is connected to the second constant current source where the second transistor is switched on by a second voltage applied to the control electrode, and a second signal level detection section which detects a signal level of the control electrode of the high-side switching element, where the second constant current source and the second transistor discharge charges accumulated in the second signal level detection section when the high-side switching element switches from the on state to the off state.

DETAILED DESCRIPTION OF THE INVENTION

Embodiments of the present invention will now be described with reference to the drawings.

FIRST EMBODIMENT

Figure 1:
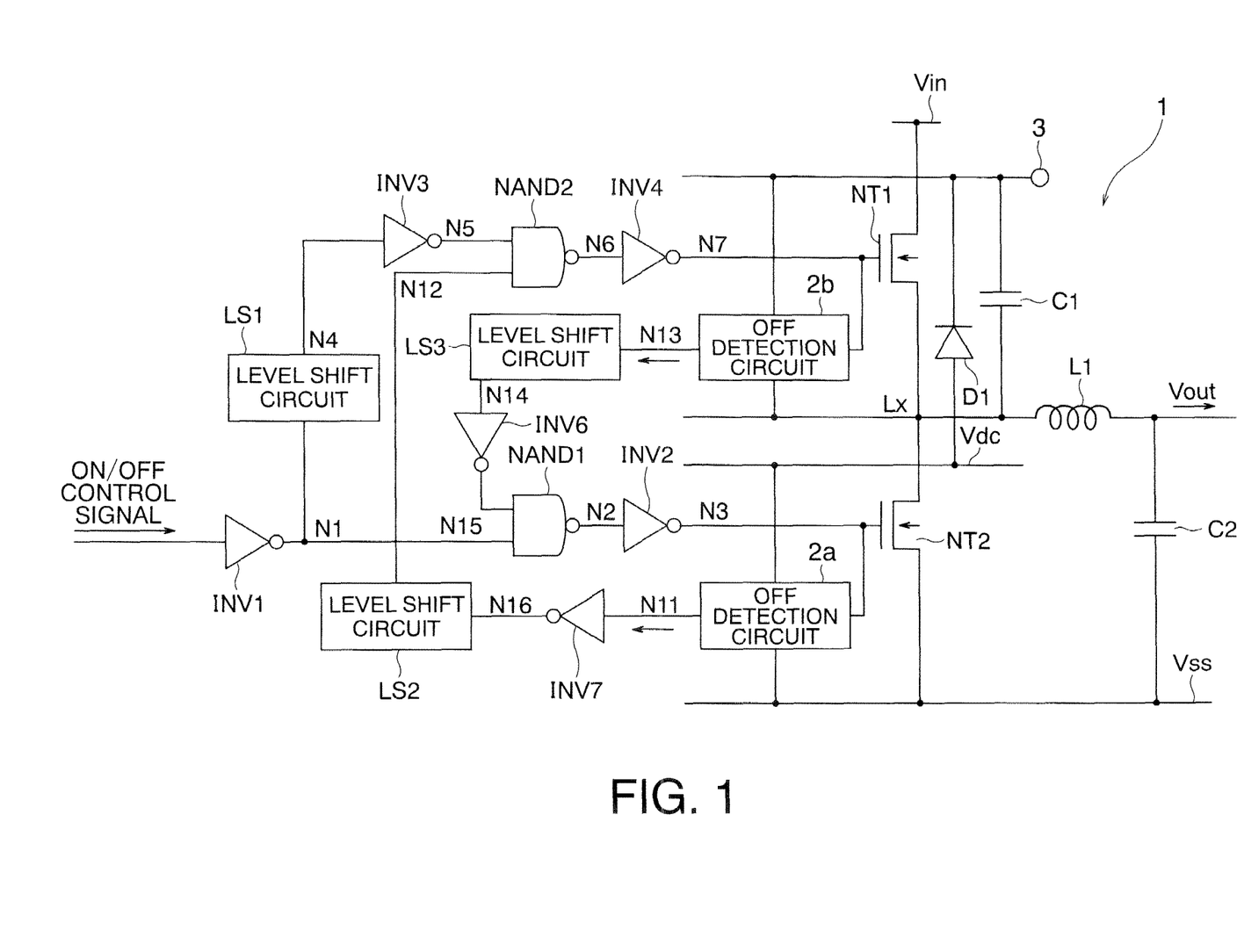
FIG. 1 is a circuit diagram showing a stepdown-type DC-DC converter as a semiconductor device according to a first embodiment of the present invention.
Figure 2:
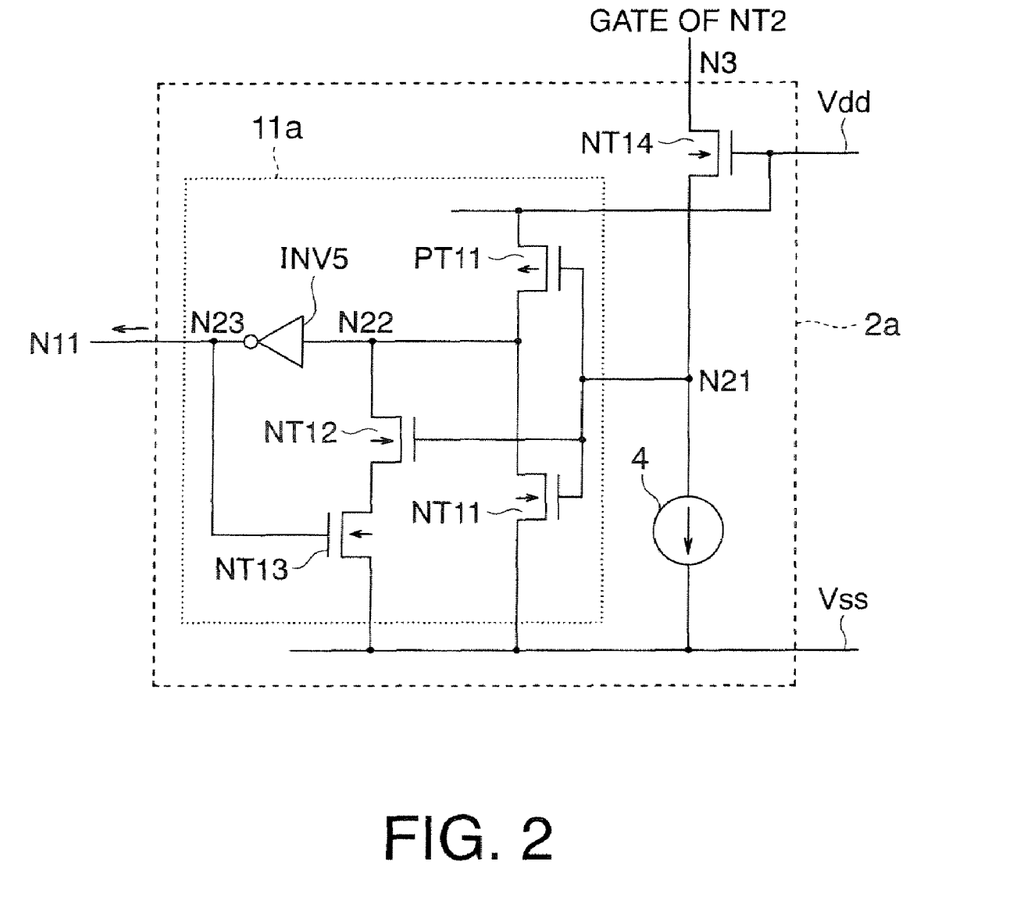
FIG. 2 is a circuit diagram showing a first off detection circuit according to the first embodiment.
Figure 3:
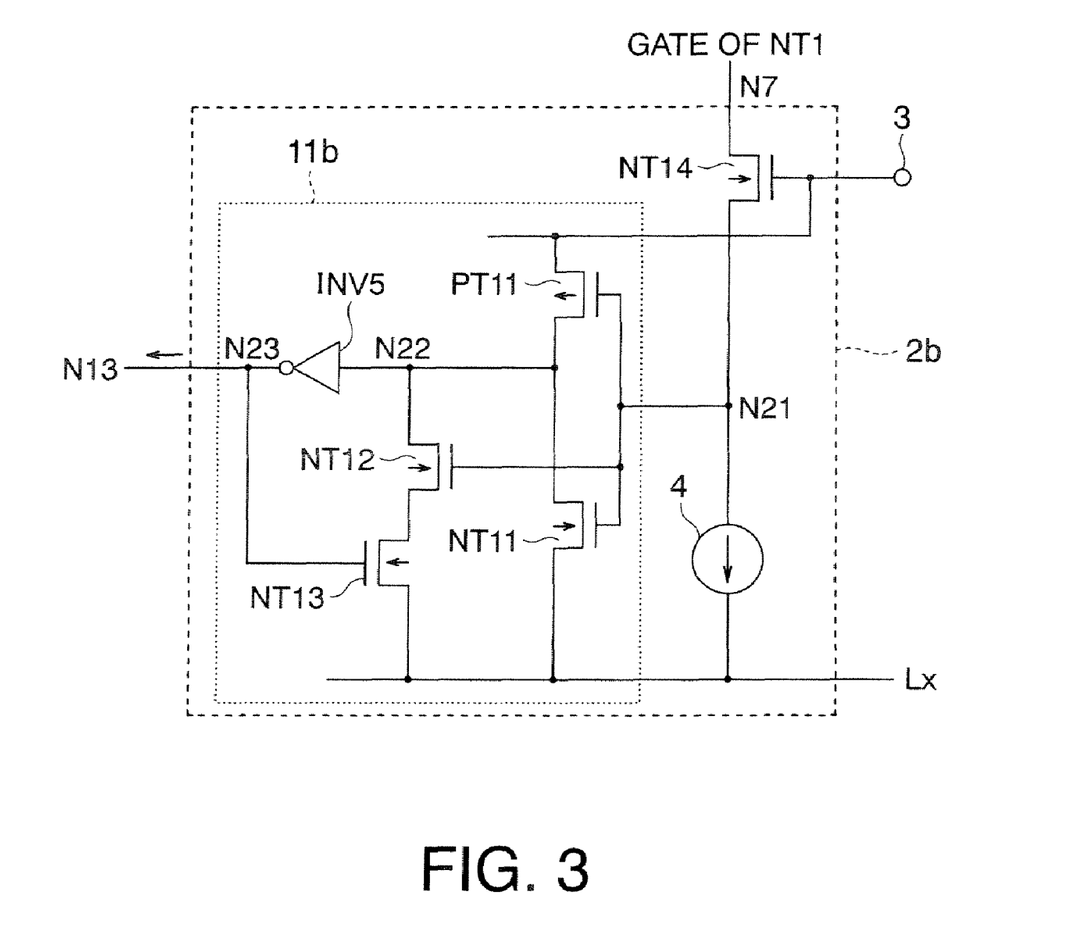
FIG. 3 is a circuit diagram showing a second off detection circuit according to the first embodiment.

First, a semiconductor device according to a first embodiment of the present invention will be described with reference to the drawings. FIG. 1 is a circuit diagram of a stepdown-type DC-DC converter as a semiconductor device, FIG. 2 is a circuit diagram showing a first off detection circuit, and FIG. 3 is a circuit diagram showing a second off detection circuit. In the present embodiment, N-channel power MOS (Metal Oxide Semiconductor) transistors with low on-resistances and high driving capabilities are respectively used as the high-side switching element and the low-side switching element of an output section.

As shown in FIG. 1, the stepdown-type DC-DC converter 1 is provided with a first off detection circuit 2a, a second off detection circuit 2b, a capacitor C1, a capacitor C2, a diode D1, inverters INV1 to INV4, an inverter INV6, an inverter INV7, an inductor L1, a first level shift circuit LS1, a second level shift circuit LS2, a third level shift circuit LS3, a 2-input NAND circuit NAND1, a 2-input NAND circuit NAND2, an N-channel power MOS transistor NT1 and an N-channel power MOS transistor NT2.

At the stepdown-type DC-DC converter, an input power (input voltage) Vin of, for instance, 19 V, that is higher than a control circuit power Vdd is inputted, while the N-channel power MOS transistor NT1 which is a high-side switching element and the N-channel power MOS transistor NT2 which is a low-side switching element are operated based on on/off control signals, and a high output current of, for instance, 1.5 V, that is lower than the control circuit power Vdd is outputted. MOS transistors are also referred to as MOSFETs (Metal Oxide Semiconductor Field Effect Transistors).

When improving conversion efficiencies of stepdown-type DC-DC converters and the like, it is necessary to reduce steady loss (which may be approximately represented as: on-resistance of power MOS transistor multiplied by output current) during the on states of both the high-side N-channel power MOS transistor NT1 and the low-side N-channel power MOS transistor NT2. In particular, reducing the on-resistance of power MOS transistors is effective.

The inverter INV1 receives as input an on/off control signal which is a signal for controlling on/off operations of the N-channel power MOS transistor NT1 which is a high-side switching element and the N-channel power MOS transistor NT2 which is a low-side switching element, and inverts their signal levels.

The 2-input NAND circuit NAND1, provided between inverters INV1 and INV6, and the inverter INV2, to which signals of node N1 outputted from the inverter INV1 and signals of node N15 outputted from the inverter INV6 are inputted, and outputs signals which are results of logical operations.

The inverter INV2, provided between the 2-input NAND circuit NAND1, and the gate of the N-channel power MOS transistor NT2 and the first off detection circuit 2a, receives as input signals of node N2 outputted from the 2-input NAND circuit NAND1 and inverts their signal levels.

The first level shift circuit LS1 is provided between the inverter INV1 and the inverter INV3, and raises the signal level of node N1, which is based on the low-potential side power source Vss, outputted from the inverter INV1 to a signal level based on a node Lx between the N-channel power MOS transistor NT1 and the N-channel power MOS transistor NT2.

The inverter INV3, provided between the first level shift circuit LS1 and the 2-input NAND circuit NAND2, receives as input signals of node N4 outputted from the first level shift circuit LS1, and inverts their signal levels.

The 2-input NAND circuit NAND2, provided between the inverter INV3 and the second level shift circuit LS2, and the inverter INV4, receives as input signals of node N5 outputted from the inverter INV3 and signals of node N12 outputted from the second level shift circuit LS2, and outputs signals which are results of logical operations.

The inverter INV4, provided between the 2-input NAND circuit NAND2, and the gate of the N-channel power MOS transistor NT1 and the second off detection circuit 2b, receives as input signals of node N6 outputted from the 2-input NAND circuit NAND2, and inverts their signal levels.

The first off detection circuit 2a, positioned between the control circuit power source Vdd and the low-potential side power source Vss, is provided between the inverter INV2 and the gate of the N-channel power MOS transistor NT2, and the inverter INV7, and detects signal levels of the gate of the N-channel power MOS transistor NT2.

The inverter INV7, provided between the first off detection circuit 2a and the second level shift circuit LS2, receives as input signals of node N11 outputted from the first off detection circuit 2a, and inverts their signal levels.

The second level shift circuit LS2 is provided between the inverter 7 and the 2-input NAND circuit NAND2, and raises the signal level of node N16, which is based on the low-potential side power source Vss and outputted from the inverter 7, to a signal level based on a node Lx between the N-channel power MOS transistor NT1 and the N-channel power MOS transistor NT2.

The second off detection circuit 2b, positioned between a BST terminal 3 and the node Lx, is provided between the inverter 4 and the gate of the N-channel power MOS transistor NT1, and the third level shift circuit LS3, and detects signal levels of the gate of the N-channel power MOS transistor NT1.

The third level shift circuit LS3, provided between the second off detection circuit 2b and the inverter 6, inputs signals of the node 13, which is based on the Node Lx between the N-channel power MOS transistor NT1 and the N-channel power MOS transistor NT2 and is outputted by the second off detection circuit 2b, and steps down the signal level to a signal level based on the low-potential side power source Vss.

The inverter INV6, provided between the third level shift circuit LS3 and the 2-input NAND circuit NAND1, receives as input signals of node N14 outputted from the third level shift circuit LS3, and outputs signals of the node N15 which are inverted signals to the 2-input NAND circuit NAND1.

A drain of the N-channel power MOS transistor NT1 is connected as a first electrode to the input power source (input voltage) Vin which is the high-potential side power source, and a source thereof is connected to the node Lx as a second electrode. Signals of the node N7 outputted from the inverter INV4 are inputted to the gate of the N-channel power MOS transistor NT1 which is a control electrode, and on/off of the N-channel power MOS transistor NT1 is operated based on the inputted signals.

A drain of the N-channel power MOS transistor NT2 is connected as a first electrode to the node Lx, and a source thereof is connected to low-potential side power source Vss as a second electrode. Signals of the node N3 outputted from the inverter INV2 are inputted to the gate of the N-channel power MOS transistor NT2 which is a control electrode, and on/off of the N-channel power MOS transistor NT2 is operated based on the inputted signals.

At the diode D1, a cathode thereof is connected to the BST terminal 3 while an anode thereof is connected to the control circuit power source Vdd, and when the control circuit power Vdd is supplied, the BST terminal is raised to the voltage level of the control circuit power source Vdd. When the N-channel power MOS transistor NT1 is switched on and the BST terminal 3 is raised to a level of Vin+Vdd, the diode D1 functions as a protection diode for preventing the BST terminal 3 from stepping down.

One end of the capacitor C1 is connected to the BST terminal 3, while the other end is connected to the node Lx side. One end of the inductor L1 is connected to the other end of the capacitor C1 and the node Lx-side, while the other end is connected to one end of the capacitor C2. The other end of the capacitor C2 is connected to the low potential-side power source Vss. The inductor L1 and the capacitors C1 and C2 enable large capacity current to be supplied to a load, not shown, under an output voltage Vout that is lower than the voltage of the node Lx.

As shown in FIG. 2, a constant current source 4, an N-channel MOS transistor NT 14 and a signal level detection section 11a are provided in the first off detection circuit 2a. The signal level detection section 11a is composed of N-channel MOS transistors NT11 to NT13, a P-channel MOS transistor PT11 and an inverter INV5, and detects signal levels of the gate of the low-side N-channel power MOS transistor NT2.

At the N-channel MOS transistor NT14, a drain thereof is connected to the gate of the N-channel power MOS transistor NT2 as a first electrode, a source thereof is connected to the node N21 as a second electrode, and a gate thereof is connected to the control circuit power source Vdd as a control electrode. The node N21 changes to a high level when the gate of the N-channel power MOS transistor NT2 is at a high level, and changes to a low level when the gate of the N-channel power MOS transistor NT2 is at a low level. For the N-channel MOS transistor NT14, a transistor with a drain-source breakdown voltage (Vds) which is greater than the MOS transistor that configures the control circuit is used so that on/off operations may be performed even when the voltage applied to the gate of the N-channel power MOS transistor NT2 is high. By using the N-channel MOS transistor NT14 in this manner, reduction in chip size may be achieved compared to cases where a P-channel MOS transistor is used.

The constant current source 4 is provided between the node N21 and the low-potential-side power source Vss, and supplies a constant current to the low-potential-side power source Vss side. Therefore, when the gate of the N-channel power MOS transistor NT2 changes from a high level to a low level, the constant current source 4 functions to promptly change the signal level of the node N21 from high to low. In addition, when the gate of the N-channel power MOS transistor NT2 is at a high level, the drain current (Id) of the N-channel MOS transistor NT14 is determined by the constant current source 4.

A source of the P-channel MOS transistor PT11 is connected to the control circuit power source Vdd, while a drain thereof is connected to the drain of the N-channel MOS transistor NT11, and a gate thereof is connected to the node N21. A source of the N-channel MOS transistor NT11 is connected to the low-potential-side power source Vss, and a gate thereof is connected to the node N21. The P-channel MOS transistor PT11 and the N-channel MOS transistor NT11 compose an inverter which receives as input signals of the node N21 and outputs inverted signals to the node N22.

The inverter INV5 receives as input signals of the node N22 and inverts the signals before outputting them to the node N23. A drain of the N-channel MOS transistor NT12 is connected to the node N22, while a source thereof is connected to the drain of the N-channel MOS transistor NT13, and a gate thereof is connected to the node N21 side. A source of the N-channel MOS transistor NT13 is connected to the low-potential-side power source Vss, and a gate thereof is connected to the node N23. Signals of the node N23 outputted from the inverter INV5 are inputted to the inverter INV7.

When the gate of the N-channel power MOS transistor NT2 changes from a high level to a low level, charges accumulated in the signal level detection section 11a are promptly discharged via the constant current source 4 and the N-channel MOS transistor NT14 which functions as a diode during its on state.

As shown in FIG. 3, a constant current source 4, an N-channel MOS transistor NT 14 and a signal level detection section 11b are provided in the second off detection circuit 2b. The signal level detection section 11b is composed of N-channel MOS transistors NT11 to NT13, a P-channel MOS transistor PT11 and an inverter INV5, and detects signal levels of the gate of the high-side N-channel power MOS transistor NT1.

At the N-channel MOS transistor NT14, a drain thereof is connected to the gate of the N-channel power MOS transistor NT1 as a first electrode, a source thereof is connected to the node N21 as a second electrode, and a gate thereof is connected to the BST terminal 3 as a control electrode. The node N21 changes to a high level when the gate of the N-channel power MOS transistor NT1 is at a high level, and changes to a low level when the gate of the N-channel power MOS transistor NT1 is at a low level. For the N-channel MOS transistor NT14, a transistor with a drain-source breakdown voltage (Vds) which is greater than the MOS transistor that configures the control circuit is used so that on/off operations may be performed even when the voltage applied to the gate of the N-channel power MOS transistor NT1 is high.

The constant current source 4 is provided between the node N21 and the node Lx, and supplies a constant current to the node Lx side. Therefore, when the gate of the N-channel power MOS transistor NT1 changes from a high level to a low level, the constant current source 4 functions to promptly change the signal level of the node N21 from high to low. In addition, when the gate of the N-channel power MOS transistor NT1 is at a high level, the drain current (Id) of the N-channel MOS transistor NT14 is determined by the constant current source 4.

A source of the P-channel MOS transistor PT11 is connected to the BST terminal 3, while a drain thereof is connected to the drain of the N-channel MOS transistor NT11, and a gate thereof is connected to the node N21. A source of the N-channel MOS transistor NT11 is connected to the node Lx, and a gate thereof is connected to the node N21. The P-channel MOS transistor PT11 and the N-channel MOS transistor NT11 compose an inverter which inputs signals of the node N21 and outputs inverted signals to the node N22.

The inverter INV5 inputs signals of the node N22 and inverts the signals before outputting them to the node N23. A drain of the N-channel MOS transistor NT12 is connected to the node N22, while a source thereof is connected to the drain of the N-channel MOS transistor NT13, and a gate thereof is connected to the node N21 side. A source of the N-channel MOS transistor NT13 is connected to the node Lx, and a gate thereof is connected to the node N23. Signals of the node N23 outputted from the inverter INV5 are inputted to the third level shift detection circuit LS3.

When the gate of the N-channel power MOS transistor NT1 changes from a high level to a low level, charges accumulated in the signal level detection section 11b are promptly discharged via the constant current source 4 and the N-channel MOS transistor NT14 which functions as a diode during its on state. The signal level of signals outputted from the inverter INV5 of the second off detection circuit 2b are higher than the signal level of signals outputted from the inverter INV5 of the first off detection circuit 2a.

Figure 4:
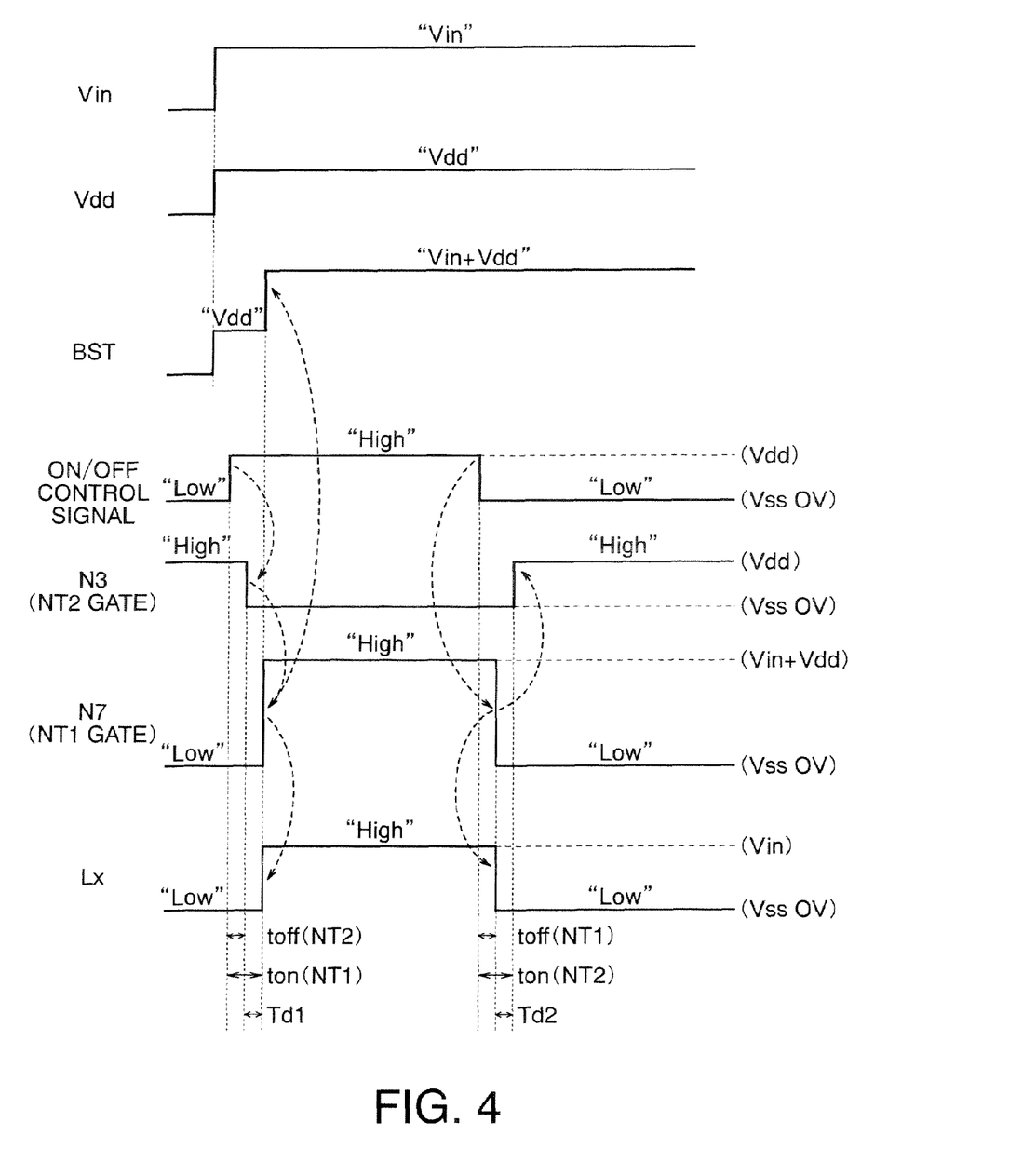
FIG. 4 is a timing chart showing an operation of the stepdown-type DC-DC according to the first embodiment.

Next, operations of the stepdown-type DC-DC converter will be described with reference to FIG. 4. FIG. 4 is a timing chart showing an operation of the stepdown-type DC-DC converter. In this case, the potential of the low-potential side power source Vss is set to 0 V of ground level, the low level of the on/off control signal is set to 0 V of ground level, and the high level is set to the voltage of the control circuit power source Vdd.

As shown in FIG. 4, at the stepdown-type DC-DC converter 1, the voltage level of the BST terminal 3 changes to a control circuit power source Vdd voltage level (Vdd level) when input power (input voltage) and control circuit power Vdd are supplied.

When the on/off control signal is at a low level, the level of the node N1 changes to high and the level of the node N5 changes to low. Since the node N5 is at a low level, the level of the node N6 which is an output of the 2-input NAND circuit NAND 2 changes to high and the level of the node N7 changes to low (Vss 0 V level), and the high-side N-channel power MOS transistor NT1 changes to off.

Since the N-channel power MOS transistor NT1 changes to off, the level of the node N13 changes to low, the level of the node N14 changes to low and the level of the node N15 changes to high. Since the node N1 is at a high level and the node 15 is at a high level, the level of the node N2 which is an output of the 2-input NAND circuit NAND1 changes to low and the level of the node N3 changes to high (Vdd level), and the low-side N-channel power MOS transistor NT2 changes to on.

Since the N-channel power MOS transistor NT1 is changed to on, the level of the node N11 changes to high, the level of the node N16 changes to low and the level of the node N12 changes to low. Therefore, the signals of the node N6 outputted from the 2-input NAND circuit NAND2 maintains a high level.

Next, when the on/off control signal changes from a low level to a high level, since the node N1 is at a low level, the level of the node N2 which is an output of the 2-input NAND circuit NAND1 changes to high and the level of the node N3 changes to low (Vss 0 V level), and the low-side N-channel power MOS transistor NT2 changes to off.

At this point, since charges accumulated in the signal level detection section 11a of the first off detection circuit 2a are promptly discharged via the constant current source 4 and the N-channel MOS transistor NT14 which functions as a diode during its on state, the low-side N-channel power MOS transistor NT2 falls rapidly, thereby reducing the fall time toff (NT2) of the gate of the N-channel power MOS transistor NT2. In addition, the time required for detection of a change from an on state to an off state of the N-channel power MOS transistor NT2 by the first off detection circuit 2a may be reduced Moreover, even when the voltage to be applied to the gate of the N-channel power MOS transistor NT2 becomes high, since the N-channel MOS transistor N14 with a large drain-source breakdown voltage (Vds) in which on/off operations may be performed is provided in the first off detection circuit 2a, the voltage applied to the gate of the N-channel power MOS transistor NT2 may be increased and the on-resistance of the N-channel power MOS transistor NT2 may be reduced.

Although the Vdd level has been used in this case as the high level of the gate of the N-channel power MOS transistor NT2, for instance, a level shift circuit may be provided between the inverter INV2 and the gate of the N-channel power MOS transistor NT2, and the high level of the gate of the N-channel power MOS transistor NT2 may be set to a level that is higher than the Vdd level in order to further reduce the on-resistance.

When the N-channel power MOS transistor NT1 changes to off, the level of the node N11 changes to low, the level of the node N16 changes to high, and the level of the node N12 changes to high. Since the node N12 is at a high level and the node N5 is at a high level, the level of the node N6 which is an output of the 2-input NAND circuit NAND2 changes to low and the level of the node N7 changes to high (Vin+Vdd level), and the high-side N-channel power MOS transistor NT1 changes to on.

At this point, since the low-side N-channel power MOS transistor NT2 has already been switched off, a dead time Td1 between the rise time ton (NT1) of the gate of the high-side N-channel power MOS transistor NT1 and the fall time toff (NT2) of the gate of the low-side N-channel power MOS transistor NT2 may be reduced.

When the N-channel power MOS transistor NT1 changes to on, the level of the node Lx changes to high (Vin level), and the voltage of the BST terminal 3 is raised to Vin+Vdd.

Next, when the on/off control signal changes from a high level to a low level, the node N1 changes to a high level, and the level of the node N5 changes to a low level. Since the node N5 is at a low level, the level of the node N6 which is an output of the 2-input NAND circuit NAND2 changes to high and the level of the node N7 changes to low (Vss 0 V level), and the high-side N-channel power MOS transistor NT1 changes to off.

At this point, since charges accumulated in the signal level detection section 11b of the second off detection circuit 2b are promptly discharged via the constant current source 4 and the N-channel MOS transistor NT14 which functions as a diode during its on state, the high-side N-channel power MOS transistor NT1 falls rapidly, thereby reducing the fall time toff (NT1) of the gate of the N-channel power MOS transistor NT1. In addition, the time required for detection of a change from an on state to an off state of the N-channel power MOS transistor NT1 by the second off detection circuit 2b may be reduced.

Moreover, even when the voltage to be applied to the gate of the N-channel power MOS transistor NT1 changes to high, since the N-channel MOS transistor N14 with a large drain-source breakdown voltage (Vds) in which on/off operations may be performed is provided in the second off detection circuit 2b, the voltage applied to the gate of the N-channel power MOS transistor NT1 may be increased and the on-resistance of the N-channel power MOS transistor NT1 may be reduced.

When the N-channel power MOS transistor NT1 changes to off, the level of the node N13 changes to low, the level of the node N14 changes to low and the level of the node N15 changes to high. Since the node N15 is at a high level and the node N1 is at a high level, the level of the node N2 which is an output of the 2-input NAND circuit NAND1 changes to low and the level of the node N3 changes to high (Vdd level), and the low-side N-channel power MOS transistor NT2 changes to on.

At this point, since the high-side N-channel power MOS transistor NT1 has already been switched to off, a dead time Td2 between the rise time ton (NT2) of the gate of the low-side N-channel power MOS transistor NT2 and the fall time toff (NT1) of the gate of the high-side N-channel power MOS transistor NT1 may be reduced.

When the N-channel power MOS transistor NT1 changes to off, the level of the node Lx changes to low, while the voltage of the BST terminal 3 is maintained at Vin+Vdd.

In a stepdown-type DC-DC converter and the like, since the on-time of the low-side N-channel power MOS transistor NT2 is set to be greater than the on-time of the high-side N-channel power MOS transistor NT1, the steady loss (which may be approximately represented as: on-resistance of power MOS transistor multiplied by output current) during the on state of the low-side N-channel power MOS transistor NT2 will be greater than the steady loss during the on state of the high-side N-channel power MOS transistor NT1.

As described above, the semiconductor device according to the present embodiment is provided with: a first off detection circuit 2a, positioned between the control circuit power source Vdd and the low-potential side power source Vss, which is provided between the inverter 2 and the gate of the N-channel power MOS transistor NT2, and the inverter 7, where the first off detection circuit 2a is composed of the constant current source 4, the inverter INV5, N-channel MOS transistors NT11 to NT14 and the P-channel MOS transistor PT11, and functions to detect signal levels of the gate of the low-side N-channel power MOS transistor NT2; and a second off detection circuit 2b, positioned between the BST terminal 3 and the node Lx, which is provided between the inverter 4 and the gate of the N-channel power MOS transistor NT1, and the third level shift circuit LS3, where the second off detection circuit 2b is composed of the constant current source 4, the inverter INV5, N-channel MOS transistors NT11 to NT14 and the P-channel MOS transistor PT11, and functions to detect signal levels of the gate of the high-side N-channel power MOS transistor NT1. The constant current source 4 functions to promptly change the potential of the gates of the N-channel power MOS transistors from a high level to a low level.

Therefore, when the low-side N-channel power MOS transistor NT2 changes from on to off, since charges accumulated in the signal level detection section 11a of the first off detection circuit 2a are promptly discharged via the constant current source 4 and the N-channel MOS transistor NT14 of the first off detection circuit 2a which functions as a diode during its on state, the fall time off (NT2) of the gate of the N-channel power MOS transistor NT2 may be reduced, thereby enabling the low-side N-channel power MOS transistor NT2 to fall rapidly. On the other hand, when the high-side N-channel power MOS transistor NT1 changes from on to off, since charges accumulated in the signal level detection section 11b of the second off detection circuit 2b are promptly discharged via the constant current source 4 and the N-channel MOS transistor NT14 of the second off detection circuit 2b which functions as a diode during its on state, the fall time toff (NT1) of the gate of the N-channel power MOS transistor NT1 may be reduced, thereby enabling the high-side N-channel power MOS transistor NT1 to fall rapidly. In addition, since a transistor with a drain-source breakdown voltage (Vds) greater than the MOS transistor that configures the control circuit so that on/off operations may be performed in even when the voltage applied to the gate of the N-channel power MOS transistor NT1 is high is provided in the N-channel MOS transistor NT14, the voltage applied to the gates of the N-channel power MOS transistors may be increased, thereby enabling the on-resistance of the N-channel power MOS transistor to be reduced.

Therefore, reduction of the dead time as well as the on-resistances of the N-channel power MOS transistors may be achieved, thereby enabling improvement of the conversion efficiency of the stepdown-type DC-DC converter.

In the present embodiment, while the first off detection circuit 2a is used for reducing the fall time of the gate of the low-side N-channel power MOS transistor to reduce the dead time Td1, and the second off detection circuit 2b is used for reducing the fall time of the gate of the high-side N-channel power MOS transistor to reduce the dead time Td2, the first off detection circuit 2a may alternatively be used to reduce only the fall time of the gate of the low-side N-channel power MOS transistor.

In addition, while a silicon dioxide film has been used as the gate insulator of the MOS transistor, MISFETs (metal insulator semiconductor field effect transistors) which use $SiN_xO_y$ films produced by thermal nitridation of silicon dioxide films, film stacks of silicon nitride film $(Si_3O_4)$/silicon dioxide film, or high-dielectric films (high-K gate insulation film) and the like as gate insulators, may be used instead.

Furthermore, while an N-channel MOS transistor NT14 with a large drain-source breakdown voltage (Vds) and a large gate-drain breakdown voltage has been used as the first off detection circuit 2a and the second off detection circuit 2b, a P-channel MOS transistor with a large drain-source breakdown voltage (Vds) and a large gate-drain breakdown voltage may be used instead. In this case, it is preferred that the source of the P-channel MOS transistor as a second electrode is connected to the gate of the N-channel power MOS transistor, the drain thereof as a first electrode is connected to the low-potential side, and an inverter is positioned at the preceding stage of the gate so that the P-channel MOS transistor is switched on when the gate is at a low level.

SECOND EMBODIMENT

Figure 5:
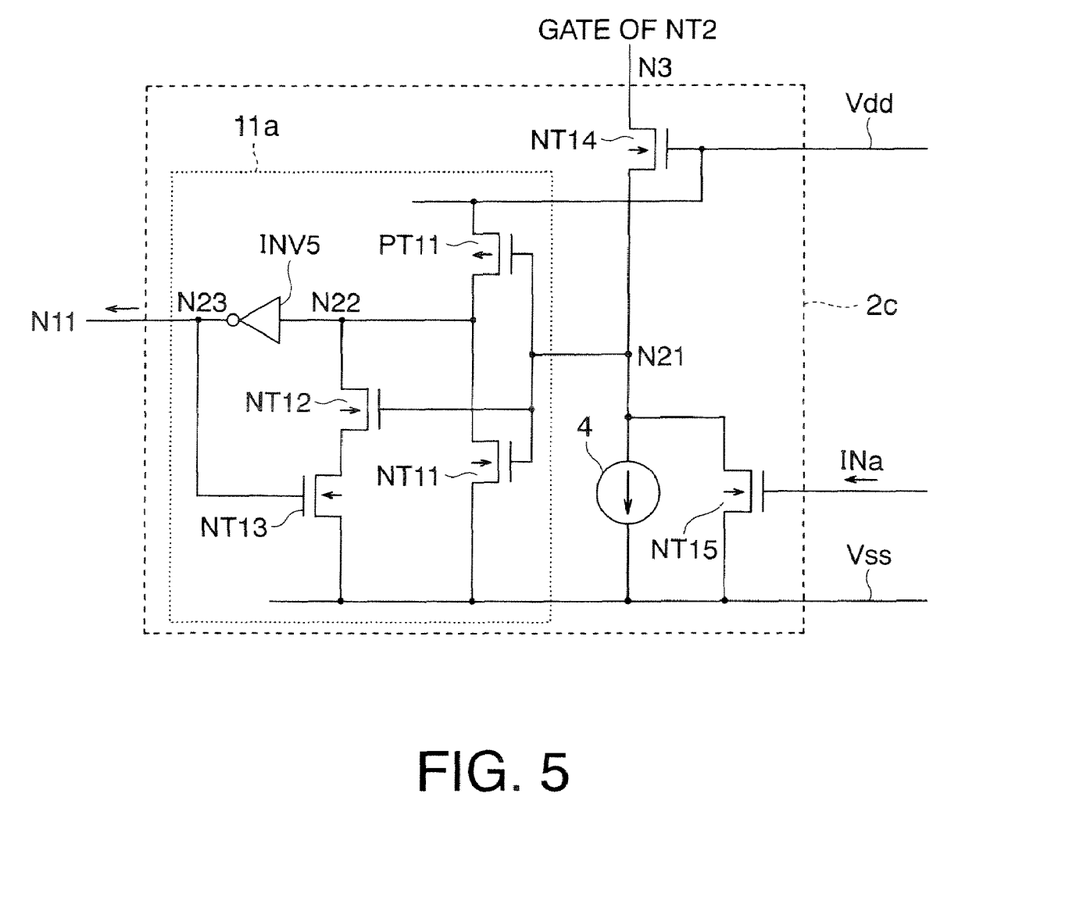
FIG. 5 is a circuit diagram showing a first off detection circuit according to a second embodiment.
Figure 6:
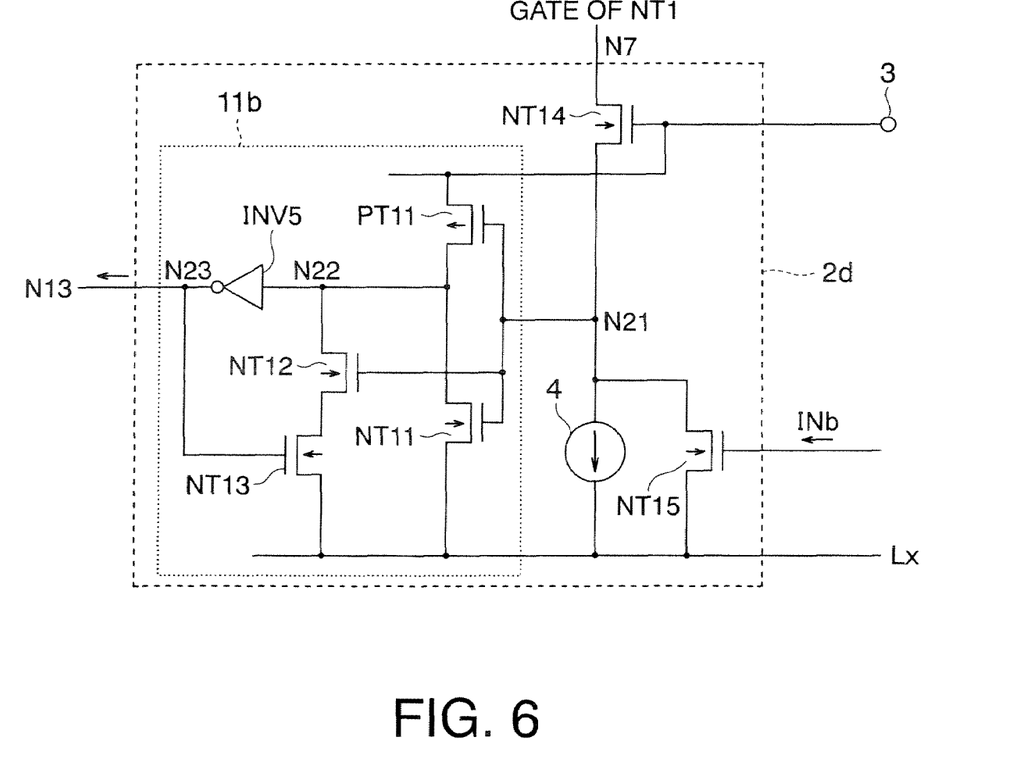
FIG. 6 is a circuit diagram showing a second off detection circuit according to the second embodiment.

Next, a semiconductor device according to a second embodiment of the present invention will be described with reference to the drawings. FIG. 5 is a circuit diagram showing a first off detection circuit, while FIG. 6 shows a second off detection circuit. For the present embodiment, N-channel MOS transistors have been added to the first and second off detection circuits of the first embodiment.

In the following description of the second, third, and fourth embodiments, like components to the first embodiment will be assigned like reference characters, and descriptions thereof will be omitted. Thus, portions that differ from the first embodiment will be explained.

As shown in FIG. 5, a constant current source 4, an N-channel MOS transistor NT 14, an N-channel MOS transistor NT 15 and a signal level detection section 11a are provided in the first off detection circuit 2c. The first off detection circuit 2c is the first off detection circuit 2a of FIG. 1 to which the N-channel MOS transistor NT 15 has been added.

The drain of the N-channel MOS transistor NT 15 of the first off detection circuit 2c is connected to a node N21, while the source thereof is connected to a low-potential side power source Vss, and a gate input signal INa is inputted to the gate thereof. When the low-side N-channel power MOS transistor NT2 changes from on to off, the gate input signal INa supplies a high level (Vdd level) signal to the N-channel MOS transistor NT 15 of the first off detection circuit 2c to switch on the N-channel MOS transistor NT 15.

As shown in FIG. 6, a constant current source 4, an N-channel MOS transistor NT 14, an N-channel MOS transistor NT 15 and a signal level detection section 11b are provided in the second off detection circuit 2d. The second off detection circuit 2d is the second off detection circuit 2b of FIG. 3 to which the N-channel MOS transistor NT 15 has been added.

The drain of the N-channel MOS transistor NT 15 of the second off detection circuit 2d is connected to a node N21, while the source thereof is connected to a node Lx, and a gate input signal INb is inputted to the gate thereof. When the high-side N-channel power MOS transistor NT1 changes from on to off, the gate input signal INb supplies a high level (Vin+Vdd level) signal to the N-channel MOS transistor NT 15 of the second off detection circuit 2d to switch on the N-channel MOS transistor NT 15.

As described above, in the semiconductor device of the present embodiment, an N-channel MOS transistor NT15 has been provided in the first off detection circuit 2c, where a gate input signal INa which is a high level (Vdd level) signal is inputted to the gate of the first off detection circuit 2c when the low-side N-channel power MOS transistor NT2 changes from on to off. An N-channel MOS transistor NT15 has been provided in the second off detection circuit 2d, where a gate input signal INb which is a high level (Vin+ Vdd level) signal is inputted to the gate of the second off detection circuit 2d when the high-side N-channel power MOS transistor NT1 changes from on to off.

Therefore, when the low-side N-channel power MOS transistor NT2 changes from on to off, since charges accumulated in the signal level detection section 11a of the first off detection circuit 2c are promptly discharged via the constant current source 4, the N-channel MOS transistor NT15 of the first off detection circuit 2c, and the N-channel MOS transistor NT14 of the first off detection circuit 2c which functions as a diode in its on state, the fall time toff (NT2) of the gate of the N-channel power MOS transistor NT2 may be reduced as compared to that of the first embodiment, thereby enabling the low-side N-channel power MOS transistor NT2 to fall rapidly. On the other hand, when the high-side N-channel power MOS transistor NT1 changes from on to off, since charges accumulated in the signal level detection section 11b of the second off detection circuit 2d are promptly discharged via the constant current source 4, the N-channel MOS transistor NT15, and the N-channel MOS transistor NT14 of the second off detection circuit 2d which functions as a diode in its on state, the fall time toff (NT1) of the gate of the N-channel power MOS transistor NT1 may be reduced as compared to that of the first embodiment, thereby enabling the high-side N-channel power MOS transistor NT1 to fall rapidly. In addition, since a transistor with a drain-source breakdown voltage (Vds) greater than the MOS transistor that configures the control circuit so that on/off operations may be performed even when the voltage applied to the gate of the N-channel power MOS transistor NT1 is high is provided in the N-channel MOS transistor NT14, the voltage applied to the gates of the N-channel power MOS transistors may be increased, thereby enabling the on-resistances of the N-channel power MOS transistors to be reduced.

Therefore, reduction in the dead time as well as the on-resistances of the N-channel power MOS transistors may be achieved, thereby enabling improvement of the conversion efficiency of the stepdown-type DC-DC converter in comparison to the first embodiment.

THIRD EMBODIMENT

Figure 7:
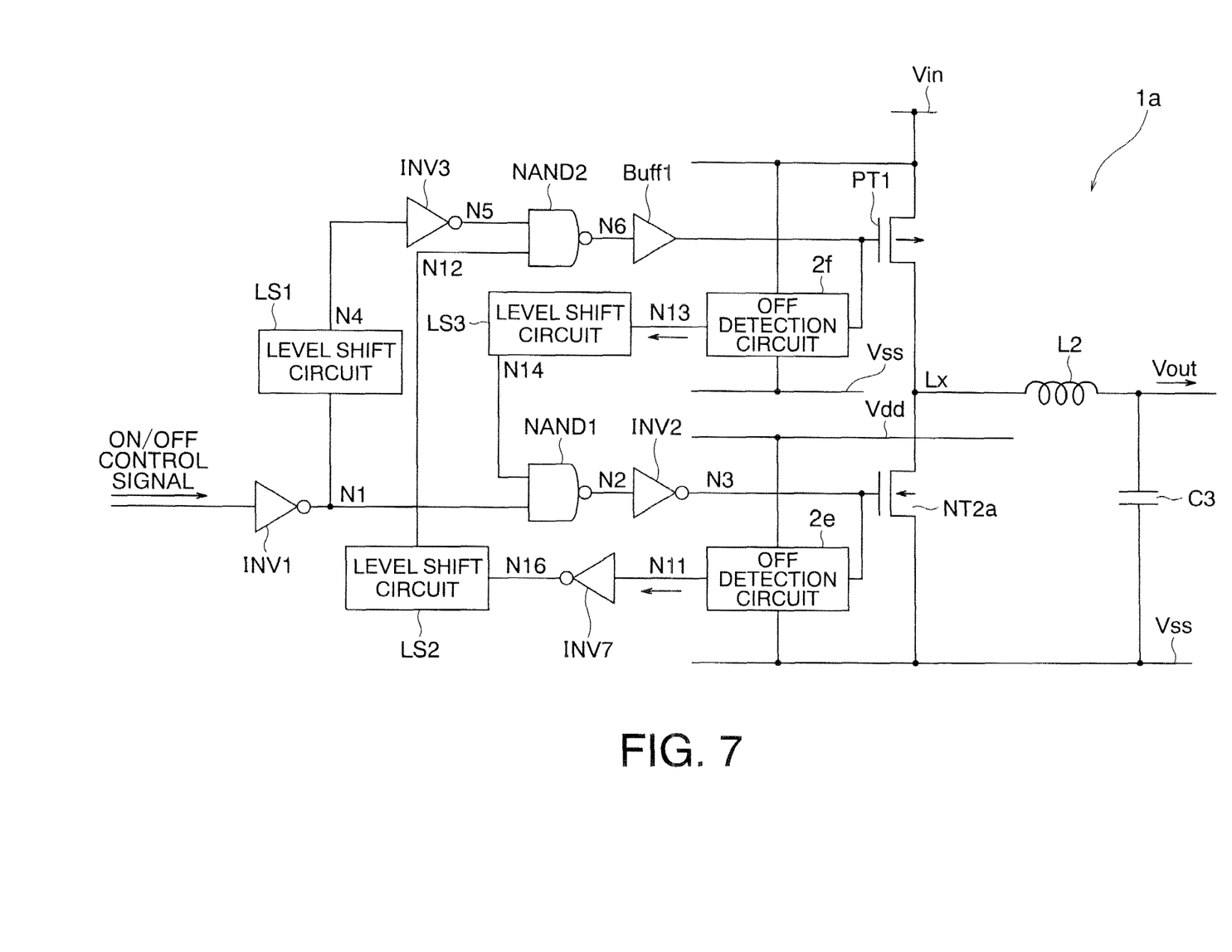
FIG. 7 is a circuit diagram showing a stepdown-type DC-DC converter as a semiconductor device according to a third embodiment.

Next, a semiconductor device according to a third embodiment of the present invention will be described with reference to the drawings. FIG. 7 is a circuit diagram showing a stepdown-type DC-DC converter as a semiconductor device. In the present embodiment, a P-channel power MOS transistor is used as the high-side switching element, while an N-channel power MOS transistor is used as the low-side switching element.

As shown in FIG. 7, the stepdown-type DC-DC converter 1a is provided with a first off detection circuit 2e, a second off detection circuit 2f, a buffer circuit Buff1, a capacitor C3, inverters INV1 to INV3, an inverter INV7, an inductor L2, a first level shift circuit LS1, a second level shift circuit LS2, a third level shift circuit LS3, a 2-input NAND circuit NAND1, a 2-input NAND circuit NAND2, an N-channel power MOS transistor NT2a and a P-channel power MOS transistor PT1.

The first level shift circuit LS1 is provided between the inverter INV1 and the inverter INV3, and raises the signal levels of the node N1 outputted from the inverter INV1.

The buffer circuit Buff1 is provided between the 2-input NAND circuit NAND2, and the gate of the P-channel power MOS transistor PT1 and the second off detection circuit 2f, and inputs signals of node N6 outputted from the 2-input NAND circuit NAND2 and drives the signals.

The first off detection circuit 2e, having the same circuit configuration as the first off detection circuit 2a shown in FIG. 2, is positioned between the control circuit power source Vdd and the low-potential side power source Vss and is provided between the inverter INV2 and the gate of the N-channel power MOS transistor NT2a, and the inverter INV7, and detects signal levels of the gate of the N-channel power MOS transistor NT2a.

The second level shift circuit LS2 is provided between the inverter INV7 and the 2-input NAND circuit NAND2, and raises signal levels of the node N16 based on the low-potential side power source Vss, outputted from the inverter INV7.

The second off detection circuit 2f, having the same circuit configuration as the second off detection circuit 2b shown in FIG. 3, is positioned between the input power source (input voltage) Vin and the low-potential side power source Vss and is provided between the buffer circuit Buff1 and the gate of the P-channel power MOS transistor PT1 and the third level shift circuit LS3, and detects signal levels of the gate of the P-channel power MOS transistor PT1.

A source of the high-side P-channel power MOS transistor PT1 is connected as a second electrode to the input power source (input voltage) Vin as a high-potential side power source, and a drain thereof is connected to the node Lx as a first electrode. Signals of the node N6 outputted from the 2-input NAND circuit NAND2 which is driven by the buffer circuit Buff1 are inputted to a gate of the high-side P-channel power MOS transistor PT1 as a control electrode, and on/off operations of the P-channel power MOS transistor PT1 are performed based on the inputted signals.

A drain of the low-side N-channel power MOS transistor NT2a is connected as a first electrode to the node Lx, and a source thereof is connected to low-potential side power source Vss as a second electrode. Signals of the node N3 outputted from the inverter INV2 are inputted to the gate which is a control electrode, and on/off operations of the N-channel power MOS transistor NT2a are performed based on the inputted signals.

One end of the inductor L2 is connected to the node Lx, while the other end is connected to one end of the capacitor C3. The other end of the capacitor C3 is connected to the low potential-side power source Vss. The inductor L2 and the capacitor C3 enable large capacity current to be supplied to a load, not shown, under an output voltage Vout that is lower than the voltage of the node Lx.

Next, operations of the stepdown-type DC-DC converter 1a will be described. When the on/off control signal is at a low level, the node N1 changes to a high level and the node N5 changes to a low level. Since the node N5 is at a low level, the level of the node N6 which is an output of the 2-input NAND circuit NAND2 changes to high, and the high-side P-channel power MOS transistor PT1 changes to off.

Since the P-channel power MOS transistor PT1 changes to off, the level of the node N13 changes to high and the level of the node N14 changes to high. Since the node N1 is at a high level and the node 14 is at a high level, the level of the node N2 which is an output of the 2-input NAND circuit NAND1 changes to low and the level of the node N3 changes to high, and the low-side N-channel power MOS transistor NT2a changes to on.

Since the N-channel power MOS transistor NT2a is changed to on, the level of the node N11 changes to high, the level of the node N16 changes to low and the level of the node N12 changes to low. The signals of the node N6 outputted from the 2-input NAND circuit NAND2 are maintained at a high level.

Next, when the on/off control signal changes from a low level to a high level, since the node N1 is at a low level, the level of the node N2 which is an output of the 2-input NAND circuit NAND1 changes to high and the level of the node N3 changes to low (Vss 0 V level), and the low-side N-channel power MOS transistor NT2 changes to off.

At this point, in the same manner as in the first embodiment, since charges accumulated in the signal level detection section of the first off detection circuit 2e are promptly discharged, the fall time of the gate of the N-channel power MOS transistor NT2a may be reduced, thereby enabling changes of the N-channel power MOS transistor NT2a from an on state to an off state to be detected in less time.

When the N-channel power MOS transistor NT2a changes to off, the node N11 changes to a low level, the node N16 changes to a high level, and the node N12 changes to a high level. Since the node N12 is at a high level and the node N5 is at a high level, the level of the node N6 which is an output of the 2-input NAND circuit NAND2 changes to low, and the high-side P-channel power MOS transistor PT1 changes to on.

When the P-channel power MOS transistor PT1 changes to on, the node Lx changes to a high level (Vin level).

Next, when the on/off control signal changes from a high level to a low level, the node N1 changes to a high level, the level of the node N5 changes to a low level. Since the node N5 is at a low level, the node N6 which is an output of the 2-input NAND circuit NAND2 changes to high and the high-side P-channel power MOS transistor PT1 changes to off.

At this point, in the same manner as in the first embodiment, since charges accumulated in the signal level detection section of the second off detection circuit 2f are promptly discharged, the fall time of the gate of the P-channel power MOS transistor PT1 may be reduced, thereby enabling changes of the P-channel power MOS transistor PT1 from an on state to an off state to be detected in less time.

Since the P-channel power MOS transistor PT1 changes to off, the level of the node N13 changes to high and the level of the node N14 changes to high. Since the node N14 is at a high level and the node N1 is at a high level, the level of the node N2 which is an output of the 2-input NAND circuit NAND1 changes to low and the level of the node N3 changes to high, and thus the low-side N-channel power MOS transistor NT2a changes to on.

When the P-channel power MOS transistor PT1 changes to off, the node Lx changes to a low level (Vss 0 V level).

As described above, the semiconductor device according to the present embodiment is provided with: a first off detection circuit 2e, positioned between the control circuit power source Vdd and the low-potential side power source Vss and provided between the inverter 2 and the gate of the N-channel power MOS transistor NT2, and the inverter 7, and functions to detect signal levels of the gate of the low-side N-channel power MOS transistor NT2; and a second off detection circuit 2f, positioned between the input power source (input voltage) Vin and the low-potential side power source Vss and provided between the buffer circuit Buff1 and the gate of the P-channel power MOS transistor PT1, and the third level shift circuit LS3, and functions to detect signal levels of the gate of the high-side P-channel power MOS transistor PT1.

Therefore, in the same manner as in the first embodiment, the fall time toff (NT2a) of the gate of the low-side N-channel power MOS transistor NT2a may be reduced. On the other hand, the fall time toff (PT1) of the gate of the high-side P-channel power MOS transistor PT1 may be reduced.

Thus, reduction in the dead time as well as the on-resistances of the power MOS transistors may be achieved, thereby enabling improvement of the conversion efficiency of the stepdown-type DC-DC converter.

FOURTH EMBODIMENT

Figure 8:
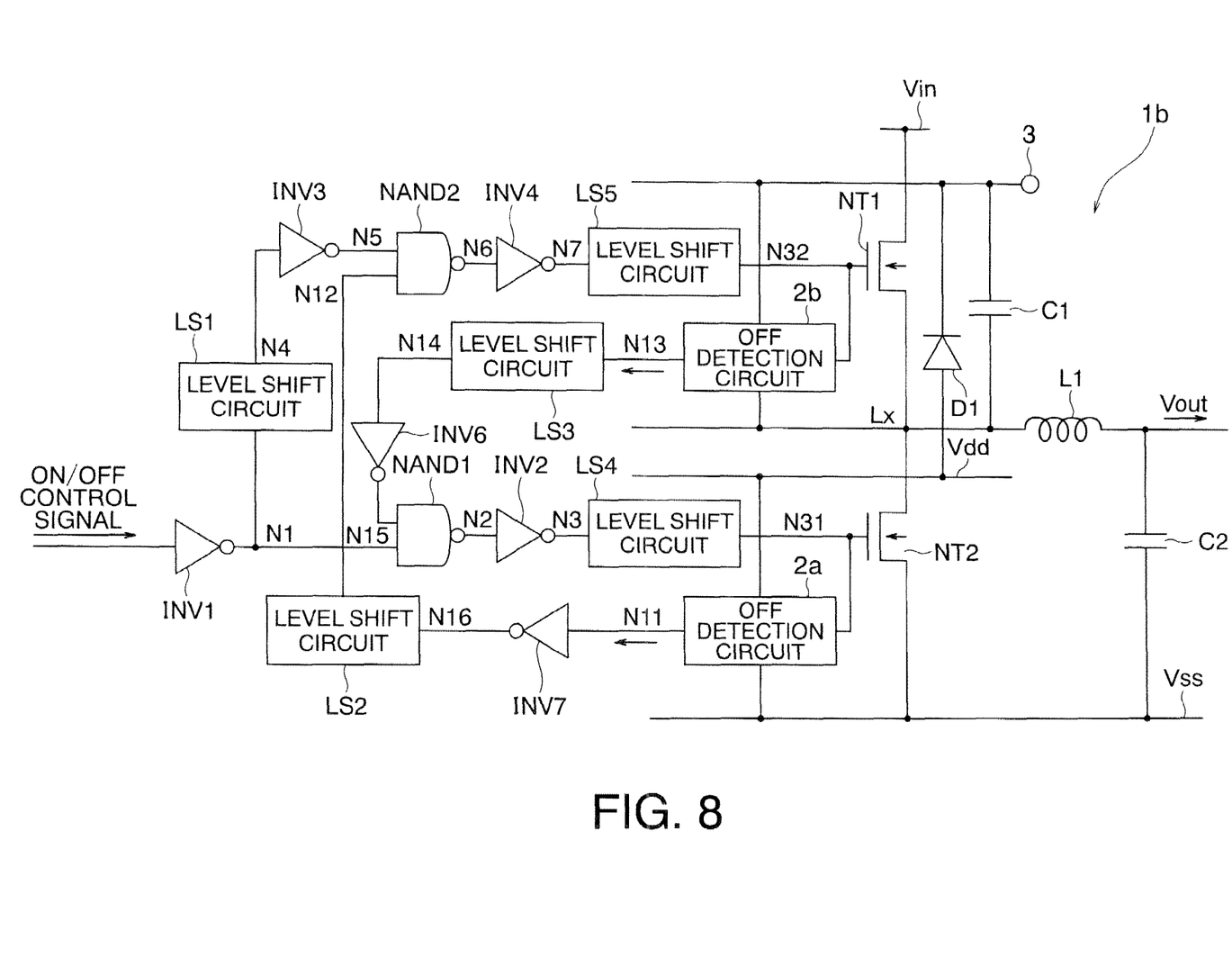
FIG. 8 is a circuit diagram showing a stepdown-type DC-DC converter as a semiconductor device according to a fourth embodiment.

Next, a semiconductor device according to a fourth embodiment of the present invention will be described with reference to the drawings. FIG. 8 is a circuit diagram showing a stepdown-type DC-DC converter as a semiconductor device. The stepdown-type DC-DC converter of the present embodiment is the stepdown-type DC-DC converter of the first embodiment to which two level shift circuits have been added.

As shown in FIG. 8, the stepdown-type DC-DC converter 1b is provided with a first off detection circuit 2a, a second off detection circuit 2b, a capacitor C1, a capacitor C2, a diode D1, inverters INV1 to INV4, an inverter INV6, an inverter INV7, an inductor L1, a first level shift circuit LS1, a second level shift circuit LS2, a third level shift circuit LS3, a fourth level shift circuit LS4, a fifth level shift circuit LS5, a 2-input NAND circuit NAND1, a 2-input NAND circuit NAND2, an N-channel power MOS transistor NT1 and an N-channel power MOS transistor NT2.

The fourth level shift circuit LS4 is provided between the inverter INV2, and the gate of the N-channel power MOS transistor NT2 and the first off detection circuit 2a, and raises the signal level of the high level signal of node N3 outputted from the inverter INV2 by a voltage V1, and outputs to the gate of the N-channel power MOS transistor NT2 and the second off detection circuit 2b as Vdd+V1.

The fifth level shift circuit LS5 is provided between the inverter INV4, and the gate of the N-channel power MOS transistor NT1 and the second off detection circuit 2b, and raises the signal level of the high level signal of node N7 outputted from the inverter INV4 by a voltage V1, and outputs to the gate of the N-channel power MOS transistor NT1 and the second off detection circuit 2b as Vin+Vdd+V1.

Figure 9:
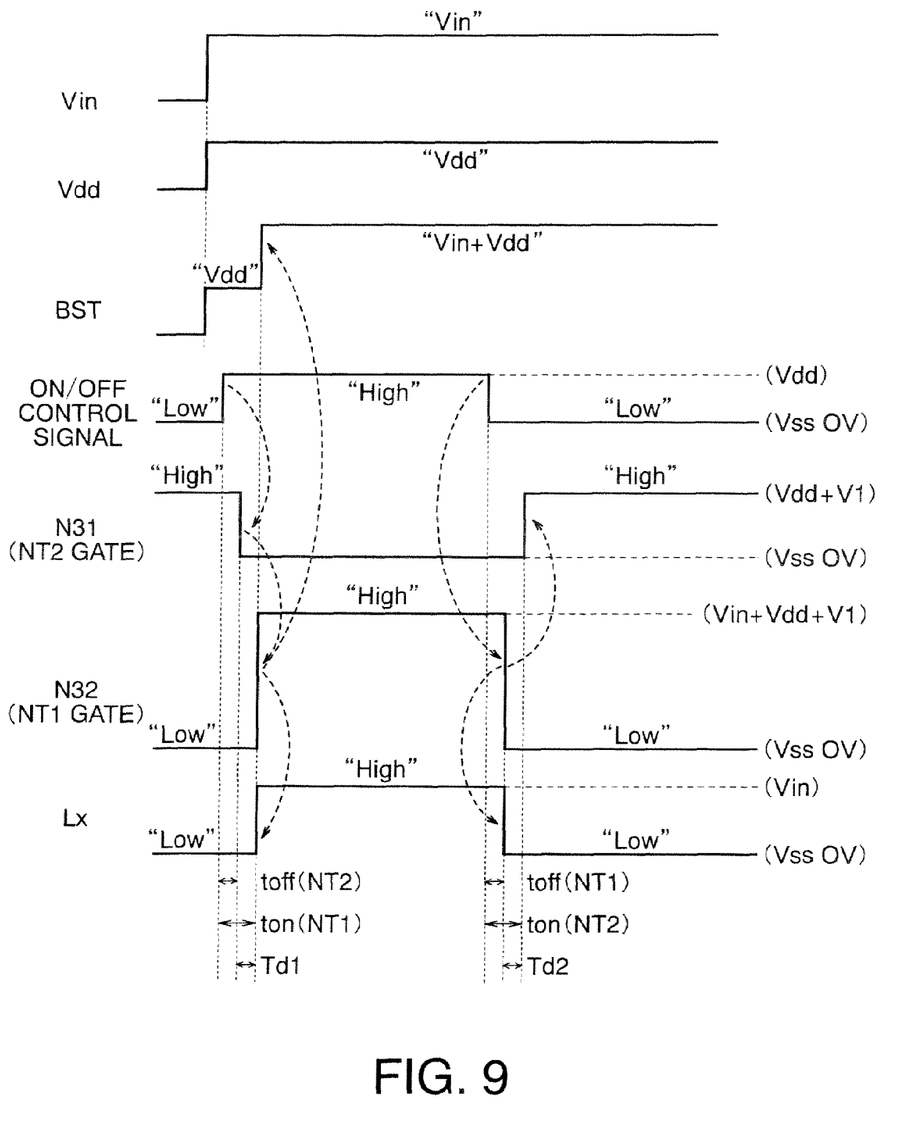
FIG. 9 is a timing chart showing an operation of the stepdown-type DC-DC according to the fourth embodiment.

Next, operations of the stepdown-type DC-DC converter will be described with reference to FIG. 9. FIG. 9 is a timing chart showing an operation of the stepdown-type DC-DC converter. In the following description, portions similar to the timing chart (FIG. 4) showing an operation of the stepdown-type DC-DC converter according to the first embodiment will be omitted.

As shown in FIG. 9, with the stepdown-type DC-DC converter 1b, when the on/off control signal is at a low level, the node N1 is at a high level, and the node N5 is at a low level. Since the node N5 is at a low level, the node N6 which is an output of the 2-input NAND circuit NAND2 changes to high, the level of the node N7 changes to low, the level of the node N32 changes to low (Vss 0 V level), and thus the high-side N-channel power MOS transistor NT1 changes to off.

Since the N-channel power MOS transistor NT1 changes to off, the level of the node N13 changes to low, the level of the node N14 changes to low and the level of the node N15 changes to high. Since the node N1 is at a high level and the node 15 is at a high level, the level of the node N2 which is an output of the 2-input NAND circuit NAND1 changes to low, the level of the node N3 changes to high and the level of the node N31 changes to high (Vdd+V1 level), and thus the low-side N-channel power MOS transistor NT2 changes to on. The signal level of the low-side N-channel power MOS transistor NT2 is higher than that of the first embodiment by V1. Since the N-channel power MOS transistor NT1 is changed to on, the level of the node N11 changes to high, the level of the node N16 changes to low and the level of the node N12 changes to low. Therefore, the signals of the node N6 outputted from the 2-input NAND circuit NAND2 are maintained at a high level.

Next, when the on/off control signal changes from a low level to a high level, since the node N1 is at a low level, the level of the node N2 which is an output of the 2-input NAND circuit NAND1 changes to high, the level of the node N3 changes to low, and the level of the node N31 changes to low (Vss 0 V level). Thus, the low-side N-channel power MOS transistor NT2 changes to off.

In this case, since the N-channel MOS transistor N14 which has a large drain-source breakdown voltage (Vds) is provided in the first off detection circuit 2a, the voltage applied to the gate of the N-channel power MOS transistor NT2 may be increased to Vdd+V1, which is greater than that of the first embodiment, and the on-resistance of the N-channel power MOS transistor NT2 may be reduced in comparison to the first embodiment.

When the N-channel power MOS transistor NT2 changes to off, the node N11 changes to a low level, the node N16 changes to a high level, and the node N12 changes to a high level. Since the node N12 is at a high level and the node N5 is at a high level, the level of the node N6 which is an output of the 2-input NAND circuit NAND2 changes to low and the level of the node N7 changes to high (Vin+Vdd+V1 level), the high-side N-channel power MOS transistor NT1 changes to on.

When the N-channel power MOS transistor NT1 changes to on, the level of the node Lx changes to high (Vin level), and the voltage of the BST terminal 3 is raised to Vin+Vdd.

Next, when the on/off control signal changes from a high level to a low level, the node N1 changes to a high level, and the level of the node N5 changes to a low level Since the node N5 is at a low level, the node N6 which is an output of the 2-input NAND circuit NAND2 changes to high, the level of the node N7 changes to low and the level of the node N32 changes to low (Vss 0 V level), and thus the high-side N-channel power MOS transistor NT1 changes to off.

In this case, since the N-channel MOS transistor N14 which has a large drain-source breakdown voltage (Vds) is provided in the second off detection circuit 2b, the voltage applied to the gate of the N-channel power MOS transistor NT1 may be increased to Vin+Vdd+V1, which is greater than that of the first embodiment, and the on-resistance of the N-channel power MOS transistor NT1 may be reduced in comparison to the first embodiment.

Since the N-channel power MOS transistor NT1 changes to off, the level of the node N13 changes to low, the level of the node N14 changes to low and the level of the node N15 changes to high. Since the node 15 is at a high level and the node N1 is at a high level, the level of the node N2 which is an output of the 2-input NAND circuit NAND1 changes to low, the level of the node N3 changes to high and the level of the node N31 changes to high (Vdd+V1 level), and thus the low-side N-channel power MOS transistor NT2 changes to on.

When the N-channel power MOS transistor NT1 changes to off, the level of the node Lx changes to low (Vss 0 V level), and the voltage of the BST terminal 3 is maintained at Vin+Vdd.

As described above, the semiconductor device according to the present embodiment is provided with: a first off detection circuit 2a, positioned between the control circuit power source Vdd and the low-potential side power source Vss and provided between the inverter 2 and the gate of the N-channel power MOS transistor NT2, and the inverter 7, where the first off detection circuit 2a is composed of the constant current source 4, the inverter INV5, N-channel MOS transistors NT11 to NT14 and the P-channel MOS transistor PT11, and functions to detect signal levels of the gate of the low-side N-channel power MOS transistor NT2; and a second off detection circuit 2b, positioned between the BST terminal 3 and the node Lx and provided between the inverter 4 and the gate of the N-channel power MOS transistor NT1, and the third level shift circuit LS3, where the second off detection circuit 2b is composed of the constant current source 4, the inverter INV5, N-channel MOS transistors NT11 to NT14 and the P-channel MOS transistor PT11, and functions to detect signal levels of the gate of the high-side N-channel power MOS transistor NT1. The constant current source 4 functions to promptly change the potential of the gate of the N-channel power MOS transistors from a high level to a low level. In addition, the signal level during an on state of the low-side N-channel power MOS transistor NT2 changes to Vdd+V1, and the signal level during an on state of the high-side N-channel power MOS transistor NT1 changes to Vin+Vdd+V1.

Therefore, when the low-side N-channel power MOS transistor NT2 changes from on to off, since charges accumulated in the signal level detection section of the first off detection circuit 2a are promptly discharged via the constant current source 4 and the N-channel MOS transistor NT14 of the first off detection circuit 2a which functions as a diode during its on state, the fall time toff (NT2) of the gate of the N-channel power MOS transistor NT2 may be reduced, thereby enabling the low-side N-channel power MOS transistor NT2 to fall rapidly. On the other hand, when the high-side N-channel power MOS transistor NT1 changes from on to off, since charges accumulated in the signal level detection section of the second off detection circuit 2b are promptly discharged via the constant current source 4 and the N-channel MOS transistor NT14 of the second off detection circuit 2b which functions as a diode in its on state, the fall time toff (NT1) of the gate of the N-channel power MOS transistor NT1 may be reduced, thereby enabling the high-side N-channel power MOS transistor NT1 to fall rapidly. In addition, since level shift circuits LS4 and LS5 are provided, the voltage applied to the gates of the N-channel power MOS transistors NT1 and NT2 may be increased as compared to the first embodiment, and the on-resistances of the N-channel power MOS transistors NT1 and NT2 may be reduced in comparison to the first embodiment.

Therefore, reduction in the dead time as well as the on-resistances of the N-channel power MOS transistors may be achieved, thereby enabling improvement of the conversion efficiency of the stepdown-type DC-DC converter in comparison to the first embodiment.

The present invention is not limited to the above-described embodiments, and various modifications may be made without departing from the spirit of the invention.

For instance, while the present invention has been applied to a stepdown-type DC-DC converter in the above embodiments, the present invention may also be applied to step-up-type DC-DC converters and regulators. In addition, while N-channel power MOS transistors have been applied as the high-side and low-side switching elements in the first and second embodiments, P-channel power MOS transistors may alternatively be used as the high-side and low-side switching elements.

Conceivable configurations of the present invention include those described in the addenda below.

Addendum 1

A semiconductor device, which includes: a high-side first N-channel power MOS transistor with a drain thereof connected to an input power source, which is on/off operated by signals inputted to a gate thereof; a low-side second N-channel power MOS transistor with a drain thereof connected to a source of the first N-channel power MOS transistor and a source thereof connected to a low-potential side power source, which is on/off operated by signals inputted to a gate thereof; a first off detection circuit, having a first N-channel MOS transistor with a drain thereof connected to the gate of the first N-channel power MOS transistor, which is switched on by a first voltage applied to a gate thereof, a first constant current source, provided between a source of the first N-channel MOS transistor and the low-potential side power source, which generates a constant current, and a first signal level detection section which detects a signal level of the gate of the first N-channel power MOS transistor, where the first N-channel MOS transistor and the first constant current source discharge charges accumulated in the first signal level detection section when the first N-channel power MOS transistor switches from the on state to the off state; and a second off detection circuit, having a second N-channel MOS transistor with a drain thereof connected to the gate of the second N-channel power MOS transistor, which is switched on by a second voltage applied to a gate thereof, a second constant current source with one end thereof connected to a source of the second N-channel MOS transistor, which generates a constant current, and a second signal level detection section which detects a signal level of the gate of the second N-channel power MOS transistor, where the second N-channel MOS transistor and the second constant current source discharge charges accumulated in the second signal level detection section when the second N-channel power MOS transistor switches from the on state to the off state; wherein the voltage during an on state applied to the gate of the second N-channel power MOS transistor is higher than the first voltage applied to the gate of the first N-channel MOS transistor.

Addendum 2

A semiconductor device, which includes: a high-side P-channel power MOS transistor with a source thereof connected to an input power source, which is on/off operated by signals inputted to a gate thereof; a low-side N-channel power MOS transistor with a drain thereof connected to a drain of the P-channel power MOS transistor and a source thereof connected to a low-potential side power source, which is on/off operated by signals inputted to a gate thereof; a first off detection circuit, having a first N-channel MOS transistor with a drain thereof connected to the gate of the first N-channel power MOS transistor, which is switched on by a first voltage applied to a gate thereof, a first constant current source, provided between a source of the first N-channel MOS transistor and the low-potential side power source, which generates a constant current, and a first signal level detection section which detects a signal level of the gate of the N-channel power MOS transistor, where the first N-channel MOS transistor and the first constant current source discharge charges accumulated in the first signal level detection section when the N-channel power MOS transistor switches from the on state to the off state; and a second off detection circuit, having a second N-channel MOS transistor with a drain thereof connected to the gate of the P-channel power MOS transistor, which is switched on by a second voltage applied to a gate thereof, a second constant current source with one end thereof connected to a source of the second N-channel MOS transistor, which generates a constant current, and a second signal level detection section which detects a signal level of the gate of the P-channel power MOS transistor, where the second N-channel MOS transistor and the second constant current source discharge charges accumulated in the second signal level detection section when the P-channel power MOS transistor switches from the on state to the off state; wherein the voltage during an on state applied to the gate of the N-channel power MOS transistor is higher than the first voltage applied to the gate of the first N-channel MOS transistor.

What is claimed is:

1. A semiconductor device comprising:
   a high-side switching element provided on a high voltage side power source side, which switches on/off according to a signal inputted to a control electrode;
   a low-side switching element provided on a low voltage side power source side, which switches on/off according to a signal inputted to a control electrode; and
   a first off detection circuit having a first constant current source which generates a constant current, a first transistor with a first electrode connected to the control electrode of the low-side switching element and a second electrode connected to the first constant current source, which is switched on by a first voltage applied to the control electrode, and a first signal level detection section which detects a signal level of the control electrode of the low-side switching element, where the first constant current source and the first transistor discharge charges accumulated in the first signal level detection section when the low-side switching element switches from the on state to the off state.

2. The semiconductor device of claim 1, wherein the first transistor is a first N-channel MOS transistor.

3. The semiconductor device of claim 2, wherein the first transistor has a drain-source breakdown voltage that is higher than those of transistors, other than the first transistor, which configure the first off detection circuit.

4. The semiconductor device of claim 1, wherein the first off detection circuit comprises a third transistor, having a first electrode connected to the second electrode of the first transistor, which is switched on by a first input signal inputted to a control electrode when the low-side switching element switches from the on state to the off state, and the first constant current source and the first and third transistors discharge charges accumulated in the first signal level detection section when the low-side switching element switches from the on state to the off state.

5. The semiconductor device of claim 4, wherein the first and third transistors are N-channel MOS transistors respectively.

6. The semiconductor device of claim 5, wherein the first transistor has a drain-source breakdown voltage that is higher than those of transistors, other than the first transistor, which configure the first off detection circuit.

7. The semiconductor device of claim 1, further comprising a first level shift circuit connected to the control electrode of the low-side switching element, which raises the signal inputted to the control electrode of the low-side switching element and outputs the raised signal to the control electrode of the low-side switching element and the first off detection circuit.

8. A semiconductor device comprising:
a high-side switching element provided on a high-potential side power source side, which switches on/off according to a signal inputted to a control electrode;
a low-side switching element provided on a low-potential side power source side, which switches on/off according to a signal inputted to a control electrode; and
a second off detection circuit having a second constant current source which generates a constant current, a second transistor with a first electrode connected to the control electrode of the high-side switching element and a second electrode connected to the second constant current source, which is switched on by a second voltage applied to the control electrode, and a second signal level detection section which detects a signal level of the control electrode of the high-side switching element, where the second constant current source and the second transistor discharge charges accumulated in the second signal level detection section when the high-side switching element switches from the on state to the off state.

9. The semiconductor device of claim 8, wherein the second transistor is a N-channel MOS transistor.

10. The semiconductor device of claim 9, wherein the second transistor has a drain-source breakdown voltage that is higher than those of transistors, other than the second transistor, which configure the second off detection circuit.

11. The semiconductor device of claim 8, wherein the second off detection circuit comprises a fourth transistor, having a first electrode connected to the second electrode of the second transistor, which is switched on by a second input signal inputted to a control electrode when the high-side switching element switches from the on state to the off state, and the second constant current source and the second and fourth transistors discharge charges accumulated in the second signal level detection section when the high-side switching element switches from the on state to the off state.

12. The semiconductor device of claim 11, wherein the second and fourth transistors are N-channel MOS transistors respectively.

13. The semiconductor device of claim 12, wherein the second transistor has a drain-source breakdown voltage that is higher than those of transistors, other than the second transistor, which configure the second off detection circuit.

14. The semiconductor device of claim 8, further comprising a second level shift circuit connected to the control electrode of the high-side switching element, which raises the signal inputted to the control electrode of the high-side switching element and outputs the raised signal to the control electrode of the high-side switching element and the second off detection circuit.

15. The semiconductor device of claim 7, wherein the first transistor has a drain-source breakdown voltage that is higher than those of transistors, other than the first transistor, which configure the first off detection circuit.

16. The semiconductor device of claim 7, wherein the first off detection circuit comprises a third transistor, having a first electrode connected to the second electrode of the first transistor, which is switched on by a first input signal inputted to a control electrode when the low-side switching element switches from the on state to the off state, and the first constant current source and the first and third transistors discharge charges accumulated in the first signal level detection section when the low-side switching element switches from the on state to the off state.

17. The semiconductor device of claim 14, wherein the second transistor has a drain-source breakdown voltage that is higher than those of transistors, other than the second transistor, which configure the second off detection circuit.

18. The semiconductor device of claim 14, wherein the second off detection circuit comprises a fourth transistor, having a first electrode connected to the second electrode of the second transistor, which is switched on by a second input signal inputted to a control electrode when the high-side switching element switches from the on state to the off state, and the second constant current source and the second and fourth transistors discharge charges accumulated in the second signal level detection section when the high-side switching element switches from the on state to the off state.

* * * * *